Sept. 20, 1932.  J. TURNER  1,878,065
MECHANICAL CONTROL
Filed April 6, 1931    3 Sheets-Sheet 1

INVENTOR
JOHN TURNER
BY Paul, Paul & Moore
ATTORNEYS

Sept. 20, 1932.   J. TURNER   1,878,065
MECHANICAL CONTROL
Filed April 6, 1931   3 Sheets-Sheet 2
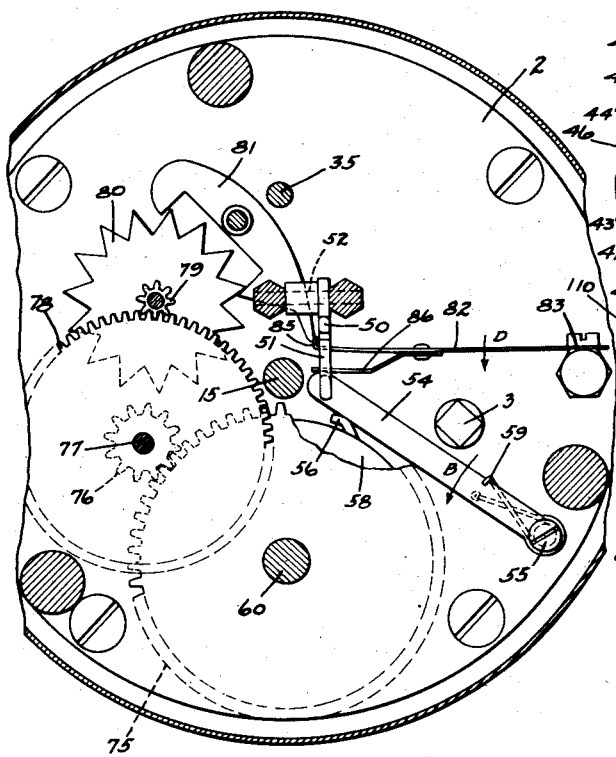
INVENTOR
JOHN TURNER
BY
ATTORNEYS

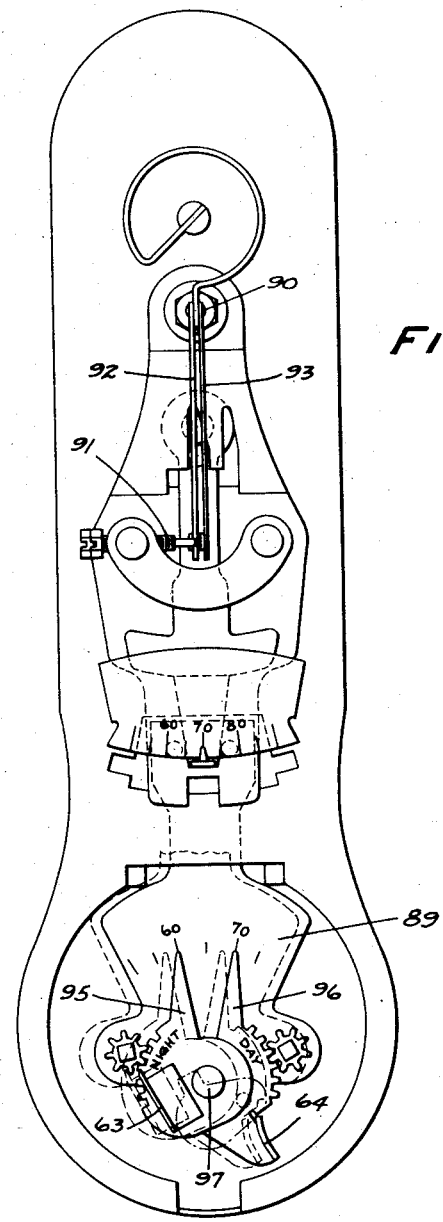

Patented Sept. 20, 1932

1,878,065

UNITED STATES PATENT OFFICE

JOHN TURNER, OF BOSTON, MASSACHUSETTS, ASSIGNOR TO MINNEAPOLIS-HONEYWELL REGULATOR COMPANY, OF MINNEAPOLIS, MINNESOTA, A CORPORATION OF DELAWARE

MECHANICAL CONTROL

Application filed April 6, 1931. Serial No. 528,225.

This invention relates to improvements in means for automatically controlling the setting of any suitable device, and finds valuable application for automatically changing the "setting" of a room thermostat which controls a heating plant.

Features of this invention include: means for moving the adjusting mechanism for the contacts of a thermostat to alternately and intermittently raise and lower the calibration; means for increasing the interval of intermittency; the provision of a motion reverser for the thermostat-adjusting mechanism along with means for driving the motion reverser; means for causing a step-by-step motion of the driving means including a trip adapted to initiate the action; means for operating the trip at timed intervals; means operable by said trip-operating means for intermittently preventing trip operation for timed intervals greater than that of the tripping intervals. The invention is applicable in other fields than heat regulation.

In practice, thermostats are so constructed that, if it is desired that the thermostat shall at night only start the heating apparatus when the room temperature is 40° and stop the apparatus when the temperature rises to 60°, the device can be so set, and if it is desired that during the day the thermostat operate, for example, to start the heating apparatus at 70° and stop it at 90°, such a setting can be made.

The present invention provides timed motive means, whereby the thermostat setting can be alternately changed from "low" to "high" every morning during the week, and then from Saturday evening until Monday morning the 40—60 setting can be maintained and then automatically changed on Monday morning to the 70—90 setting.

Objects, features and advantages of the invention will be set forth in the description of the drawings forming a part of this application, and in said drawings Figure 1 is a rear face view of a clock showing the dial, and the tripping-control mechanism positioned to permit tripping;

Figure 2 is a side elevation of Figure 1, with the casing removed, and omitting most of the clock mechanism, and showing certain of the parts in section;

Figure 3 is a vertical section taken substantially on line 3—3 of Figure 2, illustrating the driving and tripping-control mechanisms for the device which is connectible with the thermostat contact-adjusting means to change its setting;

Figure 4 is a detail further illustrating the tripping mechanism of Figure 3, and showing it in tripped condition;

Figure 8 is a face view of a thermostat having means for adjusting its calibration.

Figure 1:
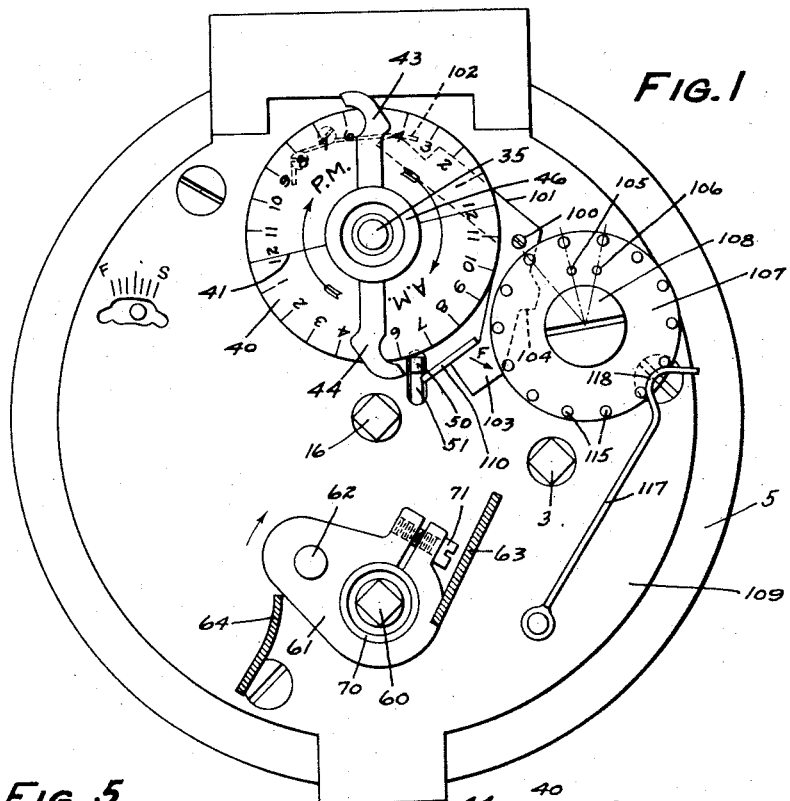

Referring to Figure 2: Numeral 1 indicates one of the frame plates of a clock. Numeral 2 indicates another plate. Between these plates are arranged the clock gear trains, and the spring barrel, not shown, inasmuch as these elements are all well known in the art. However, the winding shaft for the main spring of the clock is indicated at 3 and it passes through plates 5, 2, and is stepped in plate 1. Between plates 2 and 5 is arranged part of the mechanism of this invention, a portion of which is controlled by the hour mechanism of the clock. One section of the setting shaft for the hands of the clock is indicated at 10 and has a bearing in plate 1. The clock dial has been omitted. This element 10 has a clutch 12 which cooperates with the clutch 13 of the other portion 15 of the setting shaft. The shaft 15 is journaled in the plates 2 and 5, and projects at the rear and has a squared winding key terminal 16. A spring 17 normally holds the clutches in disengaged position as shown, and when it is desired to set the hands, the element 16 is translated and clutch members 12 and 13 are connected. Upon this shaft 10 is journaled a gear cluster composed of gears 18 and 19. The hour hand 20 is integral with this cluster. The minute hand is indicated at 21 and is attached to the shaft 10. The shaft 10 is driven in the usual manner and includes in its drive train, a gear 26 mounted on shaft 25, and pinion 27 on shaft 10. A dial 40 is driven from the hour train, and this drive includes pinion 28 of shaft 25, gears 18 and 19 of the aforementioned cluster of shaft 10 and gear 30 of shaft 35. This shaft 35 is journaled in plates 1, 2 and 5 and projects to receive dial 40 and associated parts. This shaft is held against translation by an enlargement 36 and a collar 37. The element 37 is counter-turned to provide a portion of reduced diameter indicated at 38. The reduced portion is flattened on opposites sides as at 39 and this portion 38 has mounted thereon the dial disk 40, the face of which has twenty-four major divisions, corresponding to the hours of the day, and minor divisions corresponding to half-hours. A diametric line 41 divides the dial into A. M. and P. M. areas. Projecting beyond the counter-turned portion 38 is another counter-turned portion 42 which is threaded as at 43ᵃ and flattened on one side as at 44ᵃ. On the un-flattened area of the portion 42 are rotatably arranged a pair of trip arms respectively indicated 43—44, whose function is to engage a projecting end 50 of a bellcrank trip lever 51 which is pivoted as at 52 at the inner side of the frame 5 on a suitable bracket. A washer 45, and thumb nut 46 constitute means for clamping the arms 43—44 after adjustment relative to the divisions of the dial. The trip lever has at its inner side a projection 53 which engages a lever 54 pivoted as at 55 to frame 2, and adapted to be moved laterally in the direction of the arrow A against the action of spring 59 which spring also acts to urge the arm in direction of the arrow B, see Figure 3, and against cams 56—57 carried by spring barrel 58 having a spring (not shown), which furnishes the power for rotating the thermostat-setting device. The spring shaft for the barrel 58 is indicated at 60, and this shaft is surrounded by a sleeve 70 which is attached to and rotates with the spring barrel, see Figure 1. To this sleeve is attached a crank arm 61 having a crank pin 62, the arm being split as shown and having a clamping screw 71. The pin 62 operates between adjustable brackets 63—64 of the thermostat-adjusting plate 89, see Figure 8. The crank arm can be angularly adjusted to bring the crank pin 62 into proper relation with the elements 63—64 of the room thermostat-adjusting plate.

The drum 58 carries a gear 75 (see Figure 3, which meshes with pinion 76 of shaft 77, which shaft also carries gear 78 meshing with pinion 79 on the same shaft with the escapement wheel 80. An escapement lever 81 co-operates with the wheel 80 in the usual manner, and the lever 81 is normally held against movement by means of one end of a spring arm 82 suitably supported at the opposite end as at 83. The spring arm 82 has an upturned detent portion 85 related to the terminal portion of the escapement lever 81 as shown.

The spring action of the arm 82 is in direction of arrow D. Attached to and spaced from the spring arm 82 is a second spring arm 86, the terminal of which normally engages the upper or outer end of the lever 54, when the lever is positioned as shown in Figures 2 and 3, on top of cam 56 (or 57). This lever, therefore, acts initially to hold 85 in latching position, to prevent escapement action and, therefore, drum rotation. Referring to Figure 2, it will be noted that a portion of the triplever 51 engages the plate 5 as a stop to limit motion of the lever 51 in direction opposite to that indicated by the arrow C, and to dispose arm 50 in proper relation to the disk 40 and arms 43—44. The end of projection 53, moving in direction of arrow C, pushes arm 54 in direction of arrow A from engagement with the cam 56, and during this movement its upper surface engages the element 86, so that 85 continues to be held in latching position after 54 moves off of cam 56, and until 50 moves toward disk 40, after release by either arm 43 or 44. Actual release of 85, therefore, takes place on return movement of lever 51 in a direction opposite that of the arrow C, and thus an accurately timed release period can be obtained. Thus either arm 43 or 44 (see Figure 1) moving slowly in clockwise direction first engages the arm 50, moves it outwardly and then passes beyond, releasing arm 50, at which time 85 is moved to the position shown in Figure 4.

As the drum rotates in the direction of the arrow from its position shown in Figure 4, the arm 54 under the action of the spring 55 is moved into the path of the cam 57, and against the tip of the extension 53, which tip acts as a stop, to hold the arm 54 in the rotative plane of cam 57. Since the cams 56, 57 lie in the same rotative plane, as the cam 57 approaches the position previously occupied by the cam 56, the lever 54 is again raised to the position shown in Figure 3, and engages the arm 86 and moves the spring 82 in direction opposite to that of the arrow D to arrest motion of the escapement and, therefore, to stop the motor and arrest motion of the crank arm 61. Thus 54 acts through 86 to hold 85 in latching position. The drum is given a step-by-step motion, and in this embodiment rotates 180° every time that either arm 43 or 44 releases arm 50, after pushing it outwardly from disk 40. Therefore, the crank 61 is correspondingly rotated and the pin 62, engaging corresponding element 63 or element 64 of the room thermostat-adjusting plate 89, see Figure 8, moves this plate first in one direction and then in the other, about its pivotal point 90, to bring the two contacts 91 (both of which are mounted on the plate 89, but only one of which is shown) nearer to or farther from the thermostat elements 92—93, respectively to obtain closure at lower or higher temperatures. The construction of the thermostat per se is not claimed, and, therefore, a detail description of its parts is not herein entered into. However, it may be said that the elements 63—64 are each mounted on a separate plate, the plates being respectively indicated 95—96 and these plates are adjustable about a common axis 97 so that their angular relation may be changed and, therefore, the relative positions or spacing of abutments 63—64. Each plate 95—96 is provided with a pointer, and these pointers operate over a common dial.

Thus far, there has been disclosed a driving mechanism with means for controlling it for step-by-step motion, including a trip lever, and a dial driven by a clock mechanism, the dial having arms for controlling the lever.

An important feature of the invention is means whereby a thermostat (having means for changing its setting or calibration) can be automatically changed from one setting to another, every twelve hours for example during the forepart of the week, and can then be made to remain at one of the settings for some predetermined longer time, for example from Saturday evening until Monday morning. The setting for the evening hour may be such that the thermostat will close its contacts, to initiate heat production at a temperature of 40°, and open its contacts to stop heat production at 60°, and the morning setting may be such that the thermostat will close its contacts, for the production of heat, at a temperature of 70° and open at 90° to stop production.

The drawings illustrate a device in which tripping by the arms 43—44 takes place twice in twenty-four hours, and in which the tripping can be prevented for a period of thirty-six hours.

Figure 5:
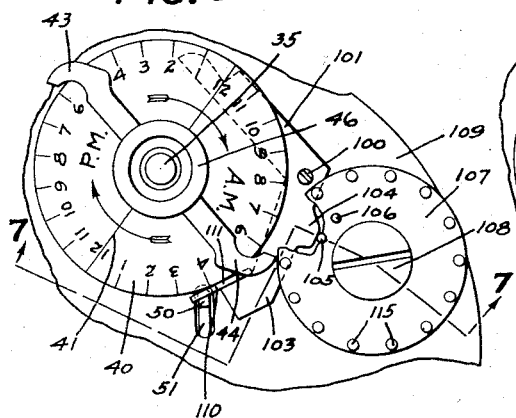
Figure 5 is a detail view of the dial, and mechanism for controlling the tripping periods, with the parts positioned to prevent tripping.
Figure 6:
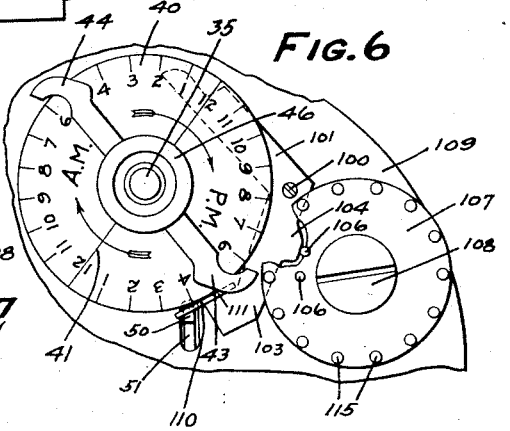
Figure 6 is a view similar to Figure 5 showing another and subsequent position of the controlling mechanism.
Figure 7:
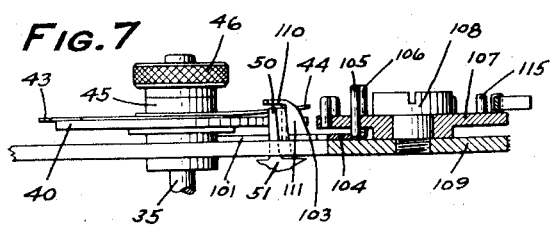
Figure 7 is a section substantially on line 7—7 of Figure 5.

The mechanism for varying the time between settings, in this instance for substantially increasing the interval between settings is as follows: A plate-like bell-crank lever is pivoted as at 100 to the plate 109, see Figures 1, 5, 6, 7. This lever has one arm 101 extending beneath the disk 40, and a spring 102 engages the outer end of the arm as shown in Figure 1, to automatically urge the other arm 103 in direction of the arrow F to normally dispose extension 104 in the path of pins 105—106 carried by disk 107 pivoted as at 108 to the plate 109, see also Figure 7. The arm 103 has an extension 111 which has a finger 110, adapted to be moved into opposition to the tip of the arm 50 of the trip lever, and the arrangement is such that when either pin 105 or 106 engages extension 104, this finger is moved to such a position that neither of the arms 43—44 can engage the element 50 to trip it. When, however, the finger 110 is positioned as shown in Figure 1, either arm 43 or 44 can move the trip 50 in direction of arrow D. The elements 43 and 44 are made of thin spring metal, and the element 110 is curved so that when finger 110 is positoned as in Figure 5, and on motion of the elements in clockwise direction, the corresponding element engages the outer curved surface of extension 111 and is flexed and rides upon finger, and thereafter is released to snap back against the face of the dial without, however, tripping the element 50.

The disk 107 is given a step-by-step rotation by alternate engagement of fingers 43—44 with pins 115. Ordinarily this disk is moved one step, or the distance between two consecutive pins, every twelve hours. There are fourteen of those pins, so that the disk makes one complete rotation every seven days. Referring to Figure 1, it will be noted each guard-finger-operating pin (105, 106) lies on a radius passing through one to the pins 115, and in this instance the space between the pins 105, 106 corresponds to a twelve hour interval. By inspection of Figure 5, it will be seen that as pin 105 engages the extension 104, the lever 101 is moved and the finger 110 assumes guard position relative to element 50, and lies in the path of the arm 44.

The disk 107 is yieldably held against rotation by means of spring 117 having portion 118 which engages two contiguous pins 115 of the disk 107. Any suitable means may be used for this purpose.

It will be noted that the operating portions of pins 105 and 106 lie between the disk 107 and the plate 109 and that, therefore, the arm 103 of the guard lever also lies between these elements.

It is obvious that an additional number of pins 105—106 may be added, and may be so positioned that the finger can be held, to prevent tripping, for a longer time. Moreover, number and relation of pins 115 may be varied.

Operation

As shown in Figure 1, the A. M. arm 44 has just tripped the element 50 and, as result of motion of the pin 62, the thermostat has been set for the 70°—90° or day range. At the end of twelve hours, in this instance about 6 P. M. Saturday evening, the P. M. arm 43 engages a pin 115 and rotates the disk 107 a distance equal to that between two consecutive pins 115, to bring pin 105 one step nearer to the extension 104. On continued motion, arm 43 trips 50, and causes the thermostat to be set for the 40°—60° or night range. At the end of another twelve hours (Sunday morning) see Figure 5, the day arm 44 engages the next pin 115, again rotates the disk 107, causing the pin 105 to engage the extension 104, moving the lever 101, and disposing element 110 in guard opposition to trip lever 50. On continued motion, 44 rides over 110 and 50 is not tripped, and, therefore, the 40°—60° setting is maintained. At 6 P. M. Sunday, see Figure 6, arm 43 again moves disk 107 bringing pin 106 in position to maintain the guard in position to prevent tripping. On Monday morning, arm 44 again moves disk 107 and moves 106 away from extension 104, allowing the arm 101 to move and withdraw the guard 110 to the position shown in Figure 1, after which this arm operates the trip 50 and causes the thermostat to be set for the 70°—90° or day range.

I claim as my invention:

1. A thermostat having means for adjusting its contacts, means for operating the adjusting means, driving means, means for causing a step-by-step motion of said driving means, including a trip adapted to initiate the action, means for operating the trip at timed intervals and means operable by said trip-operating means for intermittently preventing trip operation.

2. A device of the class described including a clock, a motor, means controlling motor operation to automatically stop it, means to start the motor including a trip, means driven by the clock and adapted to control the trip, guard means positionable to prevent trip operation by said clock driven means, and means operable by said clock driven means to position said guard means either to prevent or permit trip operation.

3. A device of the class described including a clock, a dial, and means for operating it by the clock, arms adjustable with respect to the dial, a motor, a gear train operable by the motor and including an escapement, means for normally preventing escapement operation, tripping means for moving said last means to permit escapement operation, said last mentioned means being operable by either of said arms as the dial rotates, guard means positionable to prevent tripping means operation by the arms, and means operable by the arms to position said guard means either to prevent or permit operating of said tripping means by said arms.

4. A device of the class described including a clock mechanism, a dial driven by said clock mechanism, a driving mechanism, means for controlling the driving mechanism for step-by-step motion including a trip lever, arms rotatable with the dial, and adjustable with respect thereto and adapted to trip the lever, a rotatable disk having means engageable by said dial arm before it reaches tripping position to give the disk a step-by-step motion, a guard adapted to be moved to prevent tripping of said lever by said arms, means for automatically moving said guard to permit lever tripping by said arms, and means carried by the disk and adapted to engage the guard, and move it to a position to prevent lever tripping by said arms.

5. A device of the class described including a clock mechanism, a dial driven by said clock mechanism, a thermostat having means for setting its contacts, means for moving the setting means from one position to another including a driving mechanism, means for controlling the driving mechanism for step-by-step motion including latching means adapted to arrest motion of said mechanism, and trip means for controlling said latching means, arms rotatable with the dial and adjustable with respect thereto and adapted to trip the lever, a rotatable disk having means engageable by said dial arm before it reaches engaging position to give the disk a step-by-tripping position, a guard adapted to be moved to step motion, prevent tripping of said lever by said arm, means for automatically moving said guard to permit lever tripping by said arms, and means carried by the disk and adapted to engage the guard, and move it to a position to prevent lever tripping by said arms.

6. In combination a thermostatically operable switch having means for varying its setting, a clock mechanism, a control dial and means adapting it to move in synchronism with the hour mechanism of the clock, said dial having graduations, an arm movable by the dial but adjustable with respect to dial graduations, a motor, means adapted to control the motor for step-by-step operation, including a trip element engageable by said dial for starting the motor, and means operable by the motor and adapted to move the adjusting mechanism of the thermostat.

7. An adjustable thermostat, a clock and means operated thereby for automatically adjusting said thermostat in a predetermined cyclic manner, and means operable by said clock mechanism for interrupting the action of said clock-operated means during a predetermined portion of the cycle.

8. A thermostat having adjustable setting means for changing its calibration, a clock mechanism having means for regularly adjusting said setting means repeatedly at predetermined intervals on consecutive days, and means for interrupting regular adjustments for a predetermined time and thereafter causing a resumption of the regular adjustments.

9. A thermostat having adjustable setting means for changing the calibration, a clock mechanism having means cooperable with the setting means for alternately adjusting it respectively to obtain operative thermostatic response at a lower temperature at night, and at a higher temperature in the morning repeatedly on consecutive days, and means for preventing adjustment on some predetermined day, and thereafter causing a resumption of the repeated adjustments.

In witness whereof, I have hereunto set my hand this 18th day of March 1931.

JOHN TURNER.